May 24, 1949.　　　　E. A. NEFF　　　　2,471,166
SHOCK ABSORBER WEBBING
Filed Oct. 16, 1944　　　　　　　　　　4 Sheets-Sheet 1

Inventor:
Edward A. Neff.
By Thiess, Olsen + Mecklenburger
Attorneys.

May 24, 1949.　　　　　E. A. NEFF　　　　　2,471,166
SHOCK ABSORBER WEBBING
Filed Oct. 16, 1944　　　　　　　　　　　　　　4 Sheets-Sheet 2
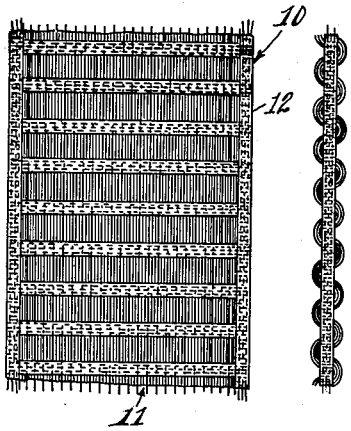
Fig.5.　　Fig.6.
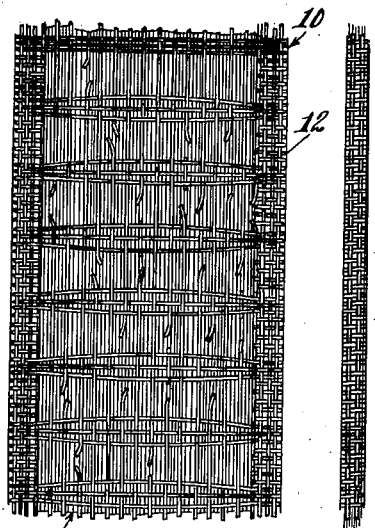
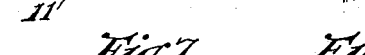
Fig.7.　　Fig.8.
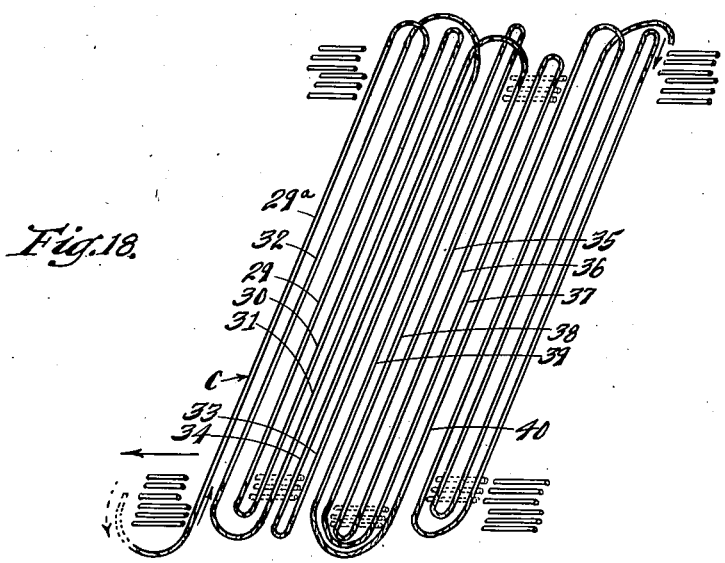
Fig.18.
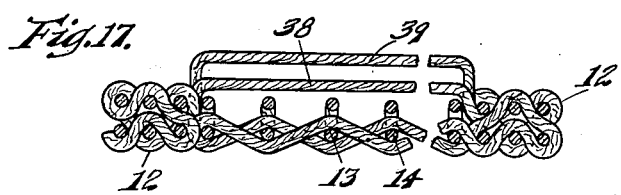
Fig.17.
Inventor:
Edward A. Neff.
By Thiess, Olson & Mecklenburger
Attorneys.

May 24, 1949.　　　　　E. A. NEFF　　　　　2,471,166
SHOCK ABSORBER WEBBING
Filed Oct. 16, 1944　　　　　　　　　　　　　4 Sheets-Sheet 3
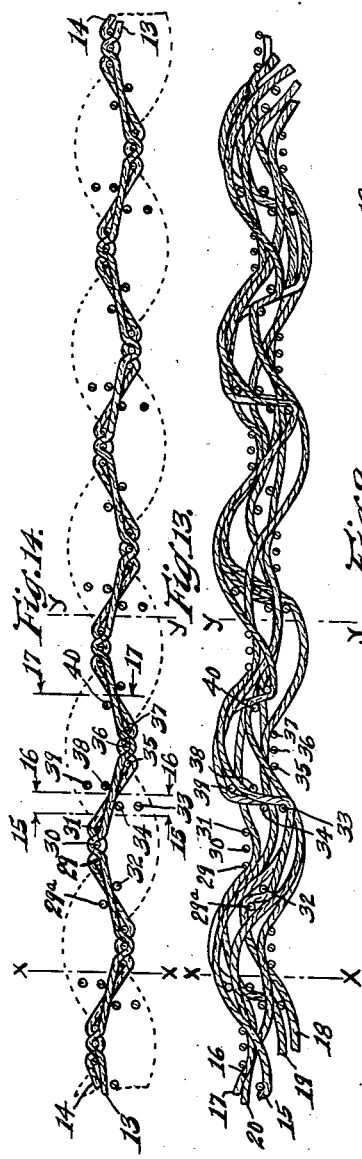
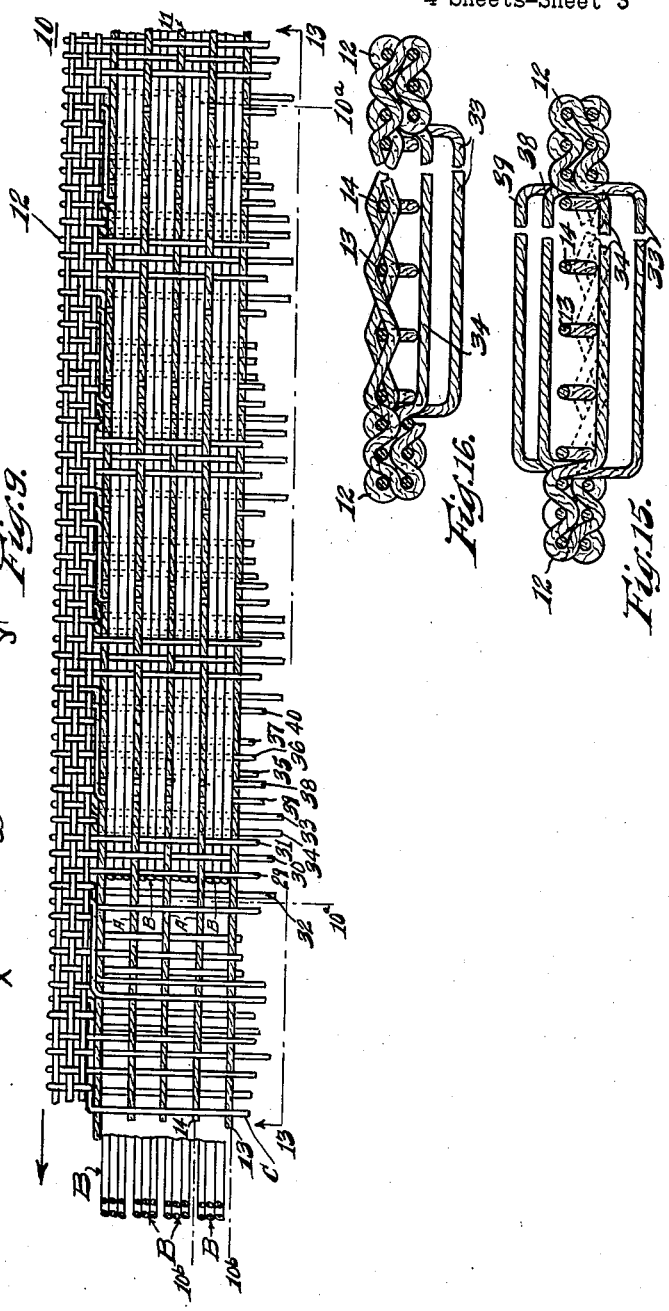
Inventor:
Edward A. Neff.
By: Thiess, Olsen & Mecklenburger
Attorneys.

May 24, 1949.  E. A. NEFF  2,471,166
SHOCK ABSORBER WEBBING
Filed Oct. 16, 1944  4 Sheets-Sheet 4
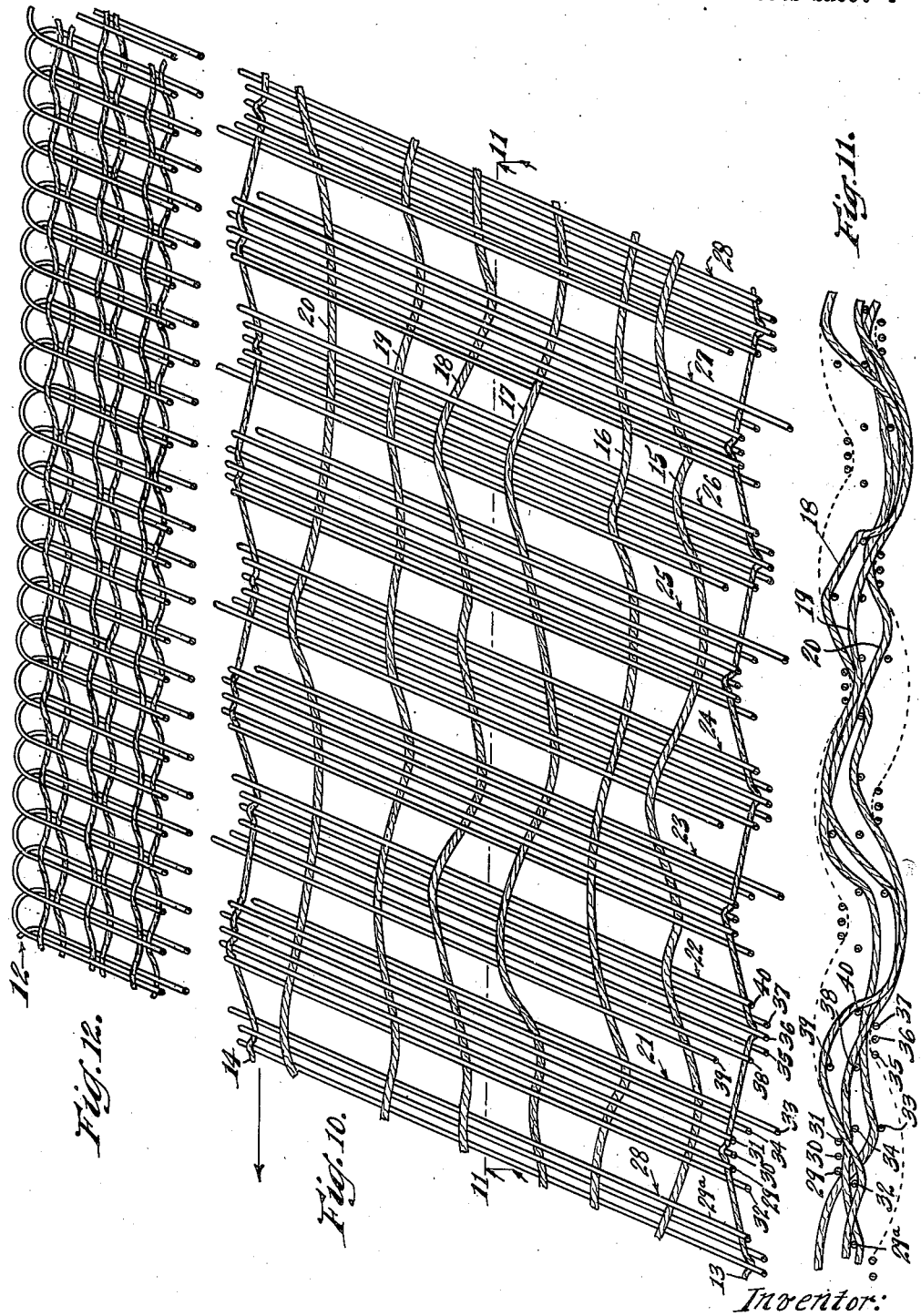
Inventor:
Edward A. Neff.
By Thiess, Olson & Mecklenburger
Attorneys.

Patented May 24, 1949

2,471,166

UNITED STATES PATENT OFFICE 2,471,166

SHOCK ABSORBER WEBBING

Edward A. Neff, Chicago, Ill.

Application October 16, 1944, Serial No. 558,793

7 Claims. (Cl. 139—384)

This invention relates to shock absorbing webbing, more particularly to shock absorbing webbing for use in parachutes and it is an object of the invention to provide improved webbing of this character.

Although the invention is not limited thereto, it is particularly applicable to and will be described in connection with parachutes and the like. It will be apparent to those skilled in the art that changes may be made, without departing from the true spirit and scope of the invention, to adapt the invention for use on driving belts or webs whenever it is desirable to embody a shock absorbing element in such applications.

It is well known to use parachutes to allow aviators to float to the earth whenever it becomes necessary to abandon their airplane, for example when the airplane has engine or other mechanical trouble, and it is also well known that the user of a parachute experiences considerable shock when the parachute opens particularly after a long fall, and the shock may be so great as to injure the parachute itself. It is extremely desirable that this shock be limited as much as possible.

Increased use of the airplane under conditions making it desirable to train large numbers of pilots, navigators and other aircraft personnel in a relatively short training period has focused attention on the use of the parachute as a safety device. Furthermore, large amounts of equipment are being dropped by parachute and in many instances personnel and equipment are dropped by the same parachute. The increased loads thus carried by the parachute result in an even greater shock when the parachute opens. Injuries to equipment being lowered as well as injuries to the parachute and to the person using it have made paramount the use of a shock absorbing device.

Parachutes include a canopy and suspension lines extending from the canopy to risers which connect the parachute to the harness worn by the user. The risers as well as the harness are made of suitable straps or webbing and the shock of breaking a fall when a parachute opens is taken directly by the risers. It is a further object of the invention to provide improved shock absorbing webbing for the risers of a parachute for limiting to a desirable value the shock caused by the opening of a parachute.

It is of importance in parachutes to keep weight and bulk at a minimum. The size of the aviator's cockpit or cabin and consequently the space available for the parachute and its harness are limited. Furthermore, in order not to disturb the flying characteristics of the airplane so that maneuverability will be maintained, the parachute and its harness must be light in weight. These considerations become of increasing importance in large transport airplanes where each person carried has a large amount of equipment and thus can add very little more. Therefore, it is a further object of the invention to provide shock absorbing webbing of the character indicated that is compact, light in weight and simple to use.

It is a further object of the invention to provide an improved shock absorbing parachute.

It is a further object of the invention to provide an improved shock absorbing device for a parachute.

In carrying out the invention in one form, a shock absorbing device for a parachute is provided having in combination means for connecting the device to a parachute, means for connecting the device to a load to be supported by a parachute, and webbing elongatable in a succession of steps thereby to absorb shock arranged to connect the parachute connecting means and the load connecting means. More particularly, shock absorbing webbing is provided having a first series of warp threads and a second series of warp threads of greater free elongated length than threads of the first series, the first series of warp threads being adapted to break under the shock. A series of weft threads are interwoven with the warp threads of the first series at spaced points and the warp threads of the second series are bulked adjacent said spaced points to give said greater free elongated length.

For a more complete understanding of the invention, reference should now be had to the accompanying drawings, in which:

Fig. 5 is an elevational view of a section of webbing embodying the invention before being used;

Fig. 6 is an edge view of the section of webbing shown in Fig. 5;

Fig. 7 is an elevational view of the section of webbing of Fig. 5 after being used;

Fig. 8 is an edge view of the section of webbing shown in Fig. 7;

Fig. 9 is an enlarged view of a portion of the webbing shown in Fig. 5, showing two series of warp threads;

Fig. 10 is an exploded perspective view of a repeating section of webbing taken between lines 10a—10a and 10b—10b of Fig. 9;

Fig. 11 is a sectional view taken substantially along line 11—11 of Fig. 10;

Fig. 12 is an exploded view of the selvage edge structure shown in Fig. 9;

Fig. 13 is a sectional view taken substantially along line 13—13 of Fig. 9 showing in somewhat compacted relationship the threads of Fig. 10;

Fig. 14 is a sectional view taken substantially along the same line as Fig. 13 showing one series of warp threads, the outline of the webbing being shown in broken lines;

Figure 1:
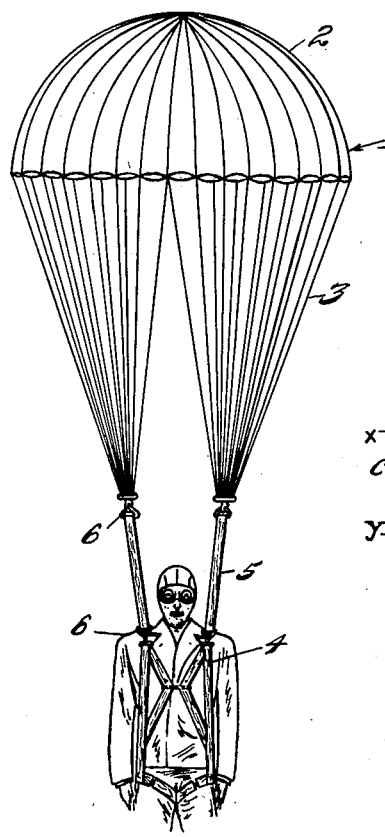
Fig. 1 is a schematic representation of a parachute embodying the invention.
Figure 2:
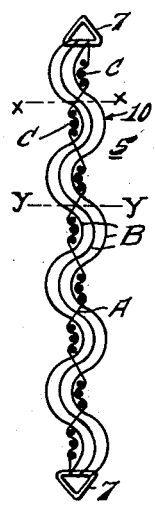
Fig. 2 is an enlarged schematic representation of a riser of the parachute of Fig. 1.
Figure 3:
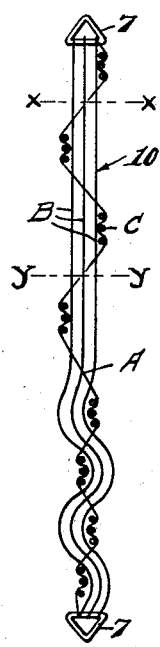
Fig. 3 is an enlarged schematic representation of the riser of Fig. 2 after partial elongation.

Figs. 15, 16 and 17 are somewhat enlarged sectional views taken substantially along lines 15—15, 16—16 and 17—17 respectively of Fig. 14, showing both edge structures and omitting one series of warp threads;

Fig. 18 is a developed view of somewhat more than one repetitive section of the weft threads.

Referring now to the drawings, the invention is shown embodied in a parachute 1 having a canopy 2 and suspension lines 3. A load, which may be personnel or matériel, to be suspended by the parachute is carried by a harness 4 and risers 5 are adapted to connect the harness 4 and the suspension lines 3 by means of hooks 6.

Figure 4:
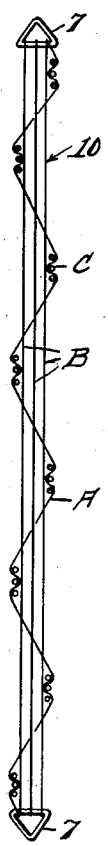
Fig. 4 is an enlarged schematic representation of the riser of Fig. 2 after complete elongation.

The riser 5 comprises webbing 10 and rings 7 for connection to hooks 6, the webbing comprising two series of longitudinal or warp threads A and B held together by weft threads C. The shock absorbing is produced within the webbing 10 of the riser 5 by the successive breaking at different points of the A series warp threads. It is well understood that in checking the speed of a moving body there will be a lesser shock if the speed is checked gradually. That is to say, if a constant resisting force is applied to a moving body it will gradually and evenly slow down without a sudden shock. A man falling freely in space reaches a high velocity, and when an ordinary parachute opens the force exerted on the parachute suspension lines and on the man may equal many times the weight of the man. The strength of the A series threads is such that the A series threads break under a much lesser force, for example twice the weight of a man. Thus when the parachute opens the great initial shock breaks the A series threads at section $x$—$x$ in the webbing, the A series of threads being of lesser length than the B series of threads so that the A series of threads rather than the B series of threads receives the initial shock. The taking of the initial shock by the A series threads partially checks the downward velocity. After the A series threads have broken at section $x$—$x$, the B series threads lengthen out but the A series of threads is gripped within the webbing, as will be explained, so that under the shock continued to be exerted the series A threads do not slip but break at a section $y$—$y$. The taking of the continued shock by the A series of threads sufficient to break them at section $y$—$y$ further checks the downward velocity and the B series of threads lengthens out further. This process continues, the A series threads breaking at spaced points until the webbing is elongated to the full length of the B series of threads, Fig. 4, so that the downward velocity is checked in a succession of steps thereby reducing the shock of parachute opening to a low value.

Figs. 1, 2, 3 and 4 are schematic to illustrate the principle of operation of the invention. Referring to the remaining figures of the drawings, more particularly to Fig. 9, the webbing 10 comprises a body portion 11 and a well known selvage edge structure 12. The body portion 11 comprises two series A and B warp threads or fibers bound together by a continuous weft thread C (Fig. 18) which also forms part of the selvage edge 12. At the left end of Fig. 9 a portion of the B series threads are shown removed from the webbing in order to illustrate the matrix for supporting the B series threads. The B series of threads is divided into groups of threads as shown, adjacent groups being separated by an A series thread. While each group of the B series of threads is shown consisting of six threads, it will be realized by those skilled in the art that any number of threads may be employed and the number of groups in the B series may be chosen to conform to the strength of webbing desired.

To obtain the shock absorber effect, the strength of the B series of threads as a group is greater than the strength of the A series of threads as a group, the B series being designed to support the shock load while the A series is designed to break under it, and to apply the load first to the A series threads the B series of threads is of greater free elongated length than the A series threads, the B series of threads being woven in loops on each side of the webbing to obtain the increased length.

Each section of the webbing between any two of the A series of threads is identical to every other section and each group of the B series repeats itself in eight loops of webbing; that is, at any two points in the webbing longitudinally spaced along the warp a distance of eight loops, four on each side of the webbing, the series B threads will occupy the same relative position. It is apparent that the number of loops constituting a repeating section may be varied without departing from the scope of the invention. Between the eight loops of webbing the threads of each group of the B series are interwoven with filler threads constituting part of the weft thread C, as will be explained, to form the loops for giving the increased length. Fig. 10 is an exploded perspective view of a repeating section of the webbing and the webbing will be further described by considering Fig. 10 as exemplary of the whole. Any number of such repeating sections may be employed to give the strength of webbing desired.

Referring to Fig. 10, a repeating section of the webbing comprises the warp threads 13, 14, which correspond to the A series previously described, warp threads 15, 16, 17, 18, 19 and 20, which correspond to the B series, and groups 21, 22, 23, 24, 25, 26, 27 and 28 of weft threads, the groups 21, 23, 25 and 27 being identical and groups 22, 24, 26 and 28 being identical, each group comprising six threads, three of which are binding threads and three of which are filler threads and all constituting a continuous weft thread (see Fig. 18). It will be observed that threads 29, 30 and 31 of group 21, which may be termed binding threads, are woven with simple weaving with warp threads 13 and 14 only and that all of warp threads 15—20 are below the binding weft threads 29, 30 and 31 (Figs. 11 and 13). The warp threads 15—20 are interwoven as shown with the weft threads 32, 33 and 34 (Figs. 11 and 12), which may appropriately be termed filler threads since they serve to bulk the warp threads 15—20 to give these warp threads a length greater than that of the warp threads 13 and 14.

In group 22, similarly to group 21 the three weft threads 35, 36 and 37, which may be termed binding threads, are woven with simple weaving with the warp threads 13 and 14 only and all of the warp threads 15—20 are above the weft threads 35, 36 and 37. Also similarly to group 21, group 22 has weft threads 38, 39 and 40 with which are interwoven the warp threads 15—20, the weft threads 38, 39 and 40 being filler threads to bulk the warp threads 15—20 to give them an increased length over the warp threads 13 and 14. Referring to Fig. 18, it will be seen that the weft threads 29, 30, 31; 32, 33, 34; 35, 36, 37; and 38, 39 and 40 are part of a continuous weft thread and constitute a repeating section. The warp threads 15—20 are interwoven with the filler threads of the groups of weft threads 23, 24, 25, 26, 27 and 28, as shown in Fig. 10, in a manner similar to that described for the groups 21 and 22, each filler threads of each group passing between a shed formed by separating four warp threads from the remaining two warp threads. The interweaving of the warp threads 15—20 with the binding threads of each group 21—28 of weft threads, as shown in Fig. 10, is such that alternate groups of the binding threads lie on the same side of the webbing adjacent the loop or bulk formed by the filler threads lying within the loop. It will be understood by those skilled in the art that the number of threads shown is merely exemplary and that different numbers of filler threads as well as different numbers of binding threads may be used.

Referring again to Figs. 9, 10, 13, 14 and 18, and assuming that the webbing is moving from right to left as shown by the arrow, the webbing is made substantially as follows:

The warp threads 13 and 14 (series A) and the warp threads 15—20 (series B) are fed into a conventional loom under different tensions, warp threads 13 and 14 which are designed to break under the shock load being under the greater tension in order to allow the warp threads 15—20 to be bulked or gathered into loops. In the first position (group 21 of the weft threads) the warp threads 15—20 are held below the warp threads 13 and 14 while a shuttle carrying the weft thread C moves back and forth to interweave the binding weft threads 29, 30 and 31 with warp threads 13 and 14. While the binding weft threads 29, 30 and 31 are being woven the completed webbing is taken up continuously. After the weft thread 31 has been made, the take-up movement of the loom is stopped and the warp threads 13 and 14, which are already interwoven with the weft threads 29, 30 and 31, are held above the warp threads 15—20 while the shuttle moves back and forth to place the filler weft threads 32, 33 and 34 in between the warp threads 15—20 as shown. Both the filler weft threads and the binding weft threads are beat into position by the slay on the loom.

Since the take-up movement is stopped and the warp threads 15—20 are under a lesser tension than the warp threads 13 and 14, beating the filler weft threads 32, 33 and 34 into place gathers the warp threads 15—20 into loops or bulks below the binding threads. Fig. 15 shows the filler threads 33 and 34 below the warp threads 13 and 14 interwoven with the binding weft threads which also form part of the selvage edge structure. The warp threads 15—20 are omitted from Fig. 15 in order to show the relative position of the weft threads but they extend under the filler thread 33, between the filler threads 33 and 34 as well as between the filler thread 34 and the binding weft threads to obtain the bulks for increasing the length of these threads over threads 13 and 14.

After completing thread 34 of group 21, the warp threads 15—20 are carried above the warp threads 13 and 14, the take-up mechanism is started again and the binding weft threads 35, 36 and 37 are interwoven only with warp threads 13 and 14 on the underside of the webbing. After completing the thread 37, the take-up movement is again stopped while the filler threads 38, 39 and 40 are interwoven with the warp threads 15—20, a loop being thereby formed on the upper side of the webbing. This process is continued until webbing of the desired length is produced. Figs. 16 and 17 similarly to Fig. 15 omit the warp threads 15—20 and show the position of the filler threads for forming the loops or bulks in the warp threads 15—20.

The operation of the webbing to produce a shock absorber effect is substantially as follows: Assuming that the webbing forms part of the riser on a parachute harness and the parachute has opened after a proper length of free falling by a user, there will be an initial shock which is of sufficient magnitude to break the A series threads (13, 14) at some section $x$—$x$ (Figs. 13 and 14), but not of sufficient magnitude to break the B series threads (15—20). The B series threads now move out to their full length at section $x$—$x$, but in doing so the B series threads become more compact due to the load being sustained and this tends to move the weft threads 29a and 32 closer to each other to grip the ends of warp threads 13 and 14. The same elongation moves weft threads 33 and 34 closer to the weft threads 38 and 39 effecting further gripping of the warp threads 13 and 14. The gripping action of filler threads 29a and 32 combined with the gripping produced by the binding weft threads 29, 30, 31; 35, 36 and 37 and, the weft filler threads 33, 34, 38 and 39 is sufficient so that breaking of the warp threads 13 and 14 will occur at some other section $y$—$y$. The B series threads then move out to their full length at section $y$—$y$. Continued checking of the downward velocity of the parachute user results in the A series threads breaking at still some other section with further lengthening out of the B series threads. This process, that is, the elongation of the webbing in a succession of steps each increment of elongation following the checking of the speed by a small amount and consequent breaking of the A series threads at some section, continues until the B series threads are elongated to their full natural length and the force of the shock is thereby absorbed.

The warp threads forming the selvage edge 12 are not bulked as are the B series warp threads but are of natural length and do not take part in the shock absorbing process. The function of the selvage edge warp threads is to provide supporting threads around which to loop the continuous weft thread C in forming the binding and filler weft threads. During the shock absorbing process the selvage edge warp threads elongate and depending on the amount of elongation necessary to produce the desired shock absorption, these threads will also break but since the gripping of the A series threads is effected within the body of the webbing breaking of the selvage edge warp threads does not affect the shock absorbing process.

While a particular embodiment of the invention has been shown, it will be understood, of course, that the invention is not limited thereto, since many modifications may be made, and it is, therefore, contemplated by the appended claims to cover any such modifications as fall within the true spirit and scope of the invention.

Having thus described the invention, what is claimed and desired to be secured by Letters Patent is:

1. Shock absorber webbing comprising in combination, a first series of warp threads adapted to break under an applied force, individual threads of said first series of warp threads being transversely spaced from each other, groups of weft threads at longitudinally spaced intervals, individual threads of said groups of weft threads being interwoven with said individual threads at said spaced intervals thereby forming a matrix; and a second series of warp threads having greater free elongated length than said first series of warp threads held within said matrix, groups of threads of said second series being interwoven with said groups of weft threads and forming loops adjacent said spaced intervals to give said increased length.

2. Shock absorber webbing comprising in combination, a first series of warp threads adapted to break under an applied force, individual threads of said first series of warp threads being transversely spaced from each other, groups of weft threads at longitudinally spaced intervals, individual threads of said groups of weft threads being interwoven with said individual threads at said intervals thereby forming a matrix, a second series of warp threads having greater free elongated length than said first series of warp threads held within said matrix, groups of threads of said second series lying between transversely spaced ones of said first series and being interwoven with said groups of weft threads, and groups of weft threads between said intervals constituting filler threads over which said groups of threads of said second series are bulked to give said increased length, both said groups of weft threads constituting continuations of each other.

3. Shock absorber webbing comprising in combination a first series of warp threads, individual ones of which are transversely spaced from each other, a second series of warp threads of greater free elongated length than the warp threads of said first series, said first series of warp threads being adapted to break under a shock, groups of weft threads at longitudinally spaced intervals, individual threads of said groups of weft threads being interwoven with the individual threads of said first series at said intervals, groups of said second series of warp threads lying between said transversely spaced ones of said first series of warp threads and being interwoven with said groups of weft threads, and filler threads in between said groups of weft threads cooperating only with the warp threads of said second series to effect bulking thereof for giving said increased length.

4. Shock absorber webbing comprising in combination a first series of warp threads individual ones of which are transversely spaced from each other, a second series of warp threads of greater free elongated length than the warp threads of said first series and of sufficient strength to support a shock, said first series of warp threads being of lesser strength than said second series and thereby being adapted to break under said shock, groups of weft threads at longitudinally spaced intervals, individual threads of said groups of weft threads being interwoven with the individual threads of said first series at said intervals, groups of said second series of warp threads lying between said transversely spaced ones of said first series of warp threads and interwoven with said groups of weft threads, and filler threads in between said groups of weft threads cooperating only with the warp threads of said second series to effect bulking thereof for giving said increased length.

5. Shock absorber webbing comprising in combination a first series of warp threads, individual ones of which are transversely spaced from each other, a second series of warp threads of greater free elongated length than the warp threads of said first series and of sufficient strength to support a shock, said first series of warp threads having a lesser number of threads than said second series and thereby being adapted to break under said shock, groups of weft threads at longitudinally spaced intervals, individual threads of said groups of weft threads being interwoven with the individual threads of said first series at said intervals, groups of said second series of warp threads lying between said transversely spaced ones of said first series of warp threads and being interwoven with said groups of weft threads, and filler threads in between said groups of weft threads cooperating only with the warp threads of said second series to effect bulking thereof for giving said increased length.

6. Shock absorber webbing comprising in combination a first series of warp threads individual ones of which are transversely spaced from each other, a second series of warp threads of greater free elongated length than the warp threads of said first series and of sufficient strength to support a shock, said first series of warp threads being of lesser strength than said second series and having a lesser number of threads than said second series thereby being adapted to break under said shock, groups of weft threads at longitudinally spaced intervals, individual threads of said groups of weft threads being interwoven with the individual threads of said first series at said intervals, groups of said second series of warp threads lying between said transversely spaced ones of said first series of warp threads and being interwoven with said groups of weft threads, and filler threads in between said groups of weft threads cooperating only with the warp threads of said second series to effect bulking thereof for giving said increased length.

7. A shock absorber device for a parachute comprising elongatable webbing including a first series of warp threads adapted to break under the shock of parachute opening, individual warp threads of said first series being transversely spaced from each other, groups of weft threads at longitudinally spaced intervals, individual threads of said groups of weft threads being interwoven with said individual warp threads at said spaced intervals, and a second series of warp threads having greater free elongated length than said first series of warp threads, groups of threads of said second series being interwoven with said groups of weft threads and forming loops adjacent said spaced intervals to give said increased length.

EDWARD A. NEFF.

(References on following page)

REFERENCES CITED

The following references are of record in the file of this patent:

UNITED STATES PATENTS

| Number | Name | Date |
|---|---|---|
| 369,276 | Cumnock | Aug. 30, 1887 |
| 793,524 | Hewett | June 27, 1905 |
| 1,313,037 | Adams | Aug. 12, 1919 |
| 1,875,445 | Hall | Sept. 6, 1932 |
| 1,935,339 | Tricau | Nov. 14, 1933 |
| 2,171,626 | Dreyfus et al. | Sept. 5, 1939 |
| 2,288,397 | French | June 30, 1942 |
| 2,352,036 | Tauty | June 20, 1944 |
| 2,353,872 | Brickman | July 18, 1944 |

FOREIGN PATENTS

| Number | Country | Date |
|---|---|---|
| 78 | Great Britain | 1857 |
| 3,286 | Great Britain | 1874 |
| 122,076 | Great Britain | Jan. 16, 1919 |
| 549,953 | Great Britain | Dec. 15, 1942 |

Certificate of Correction

Patent No. 2,471,166. May 24, 1949.

EDWARD A. NEFF

It is hereby certified that errors appear in the printed specification of the above numbered patent requiring correction as follows:

Column 4, line 7, after the letter "B" insert *of;* line 74, for "(Figs. 11 and 12)" read *(Figs. 11 and 13);* column 5, line 23, for the word "threads" read *thread;* column 8, line 14, for "one" read *ones;* and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*